Patented May 9, 1944

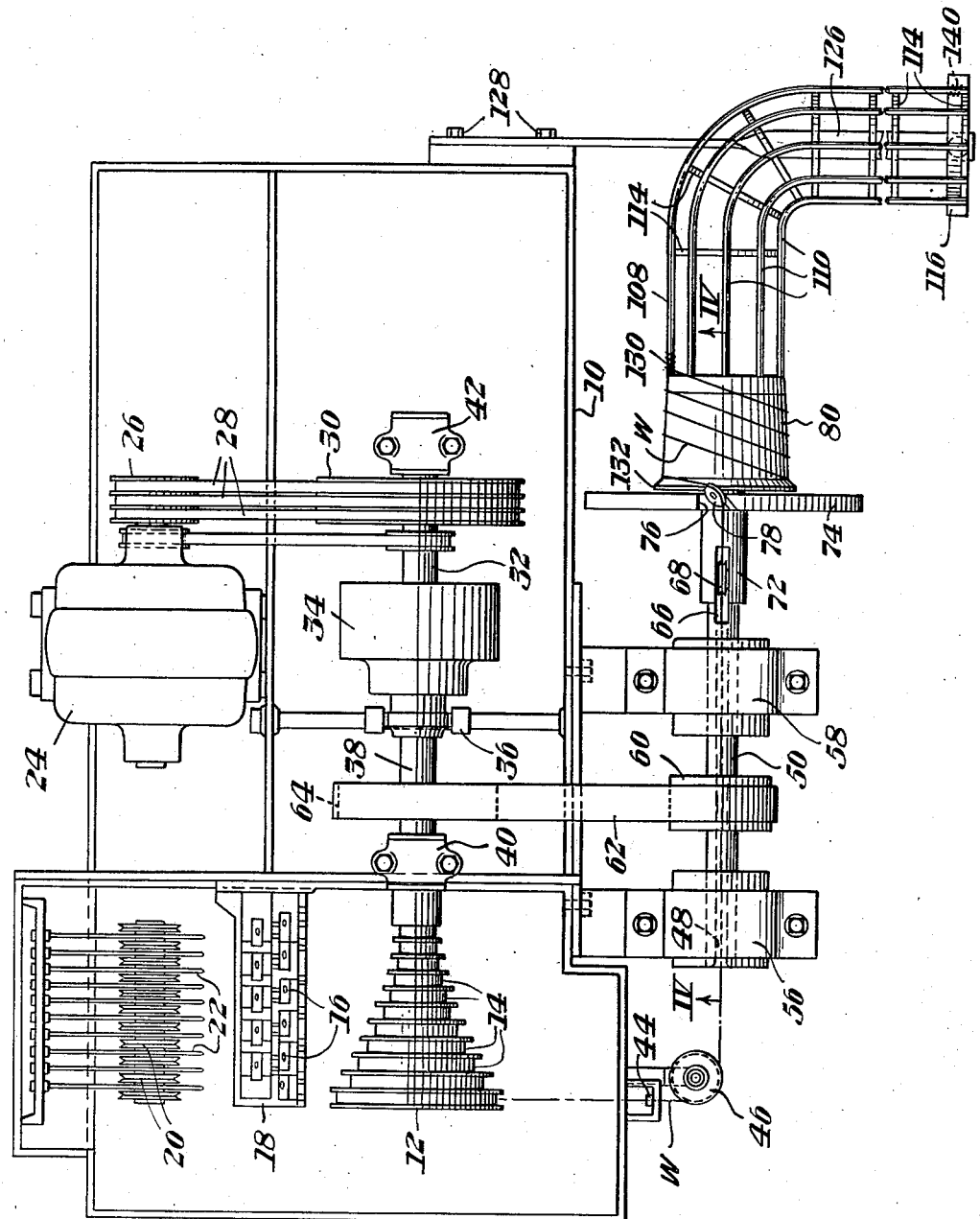

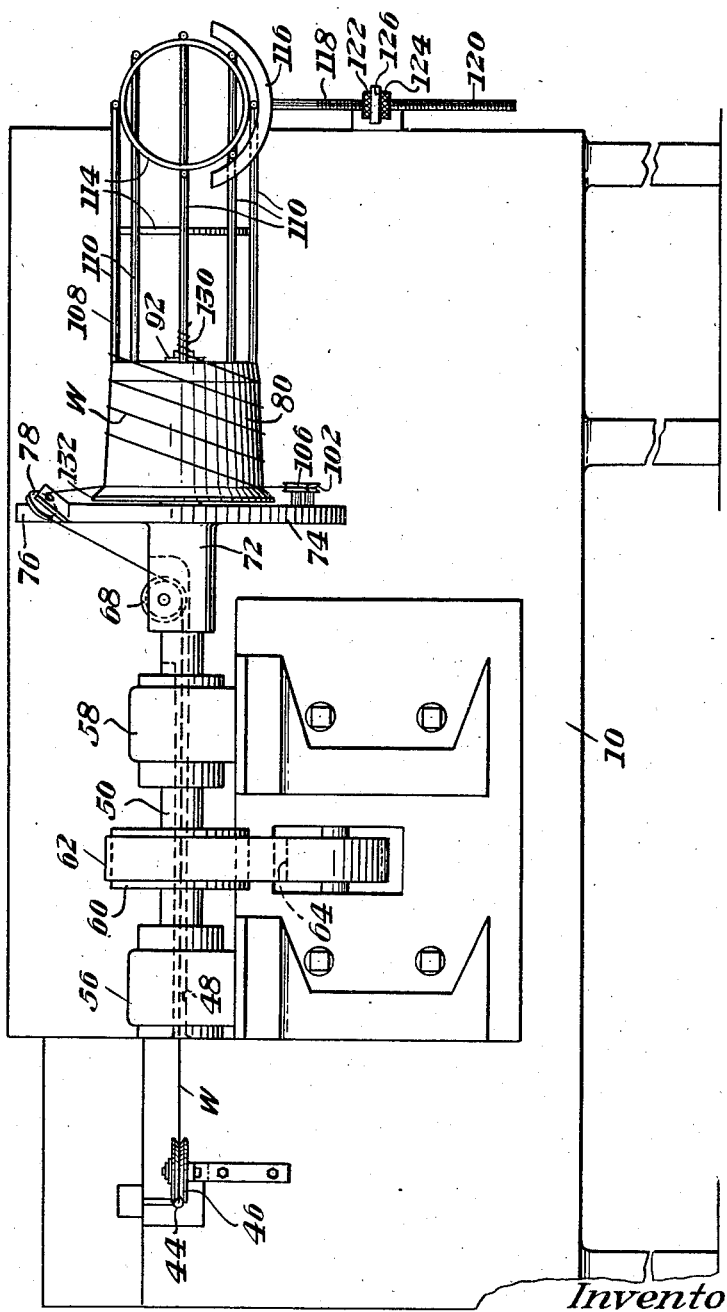

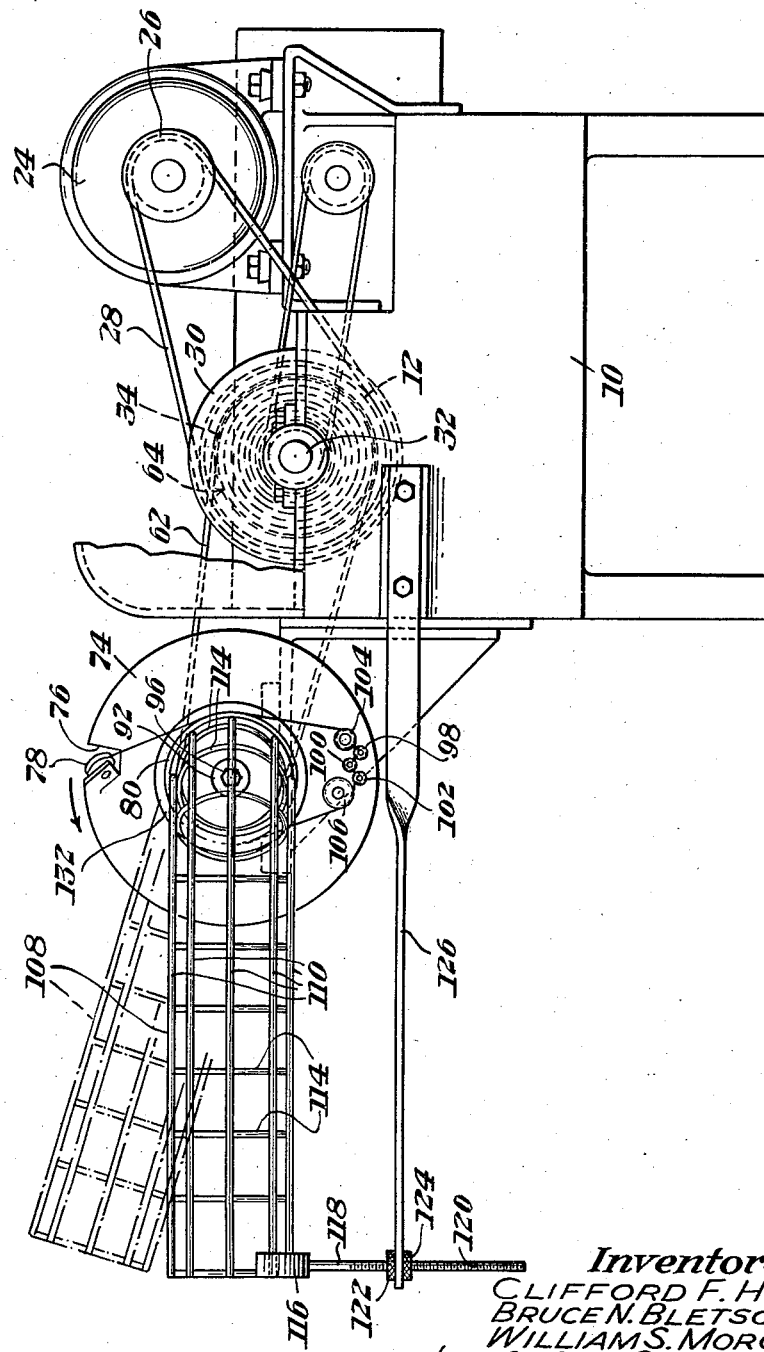

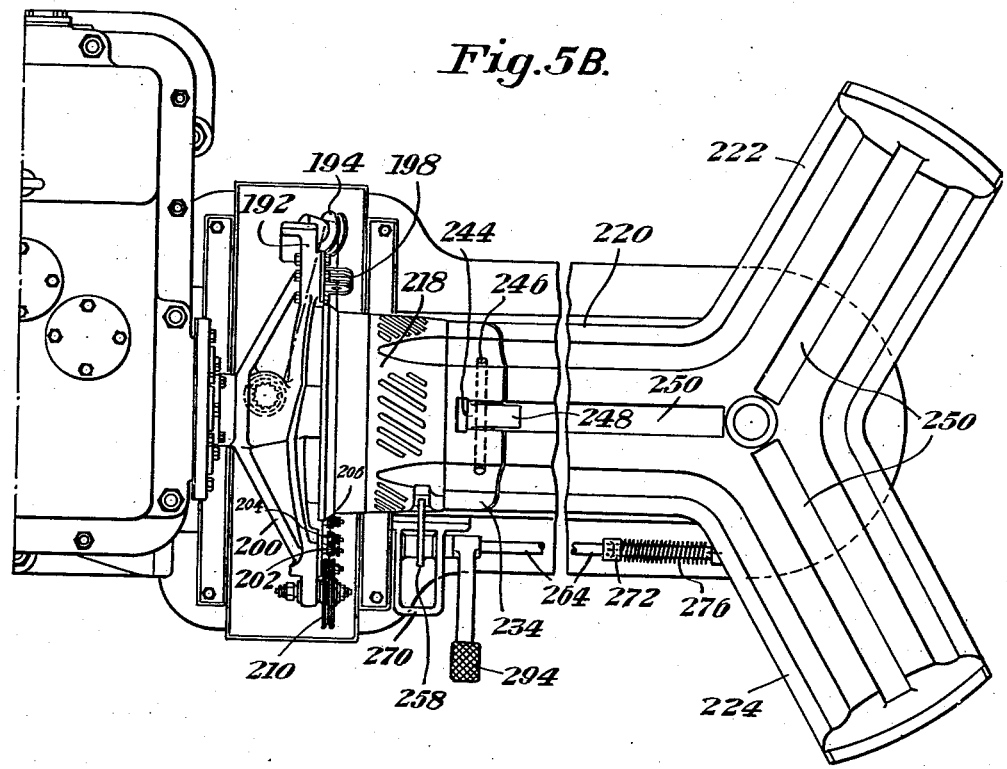
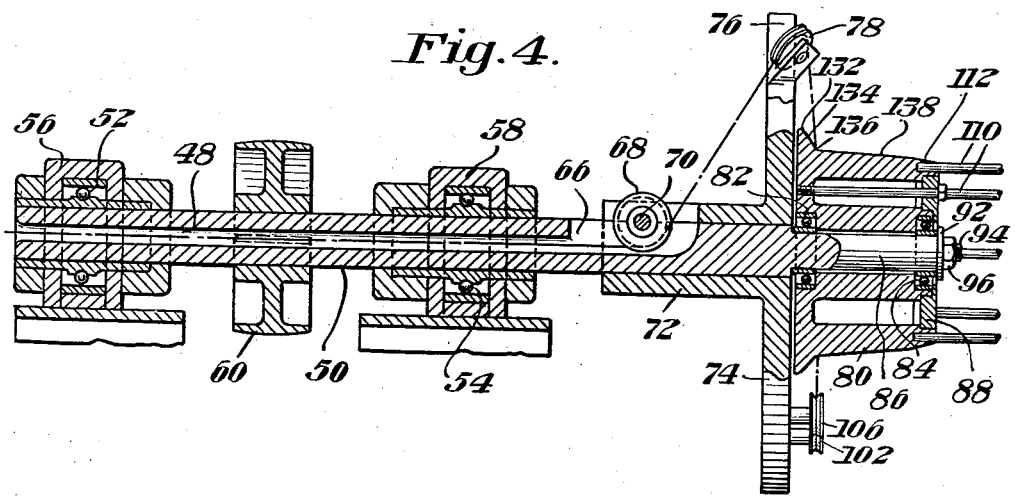

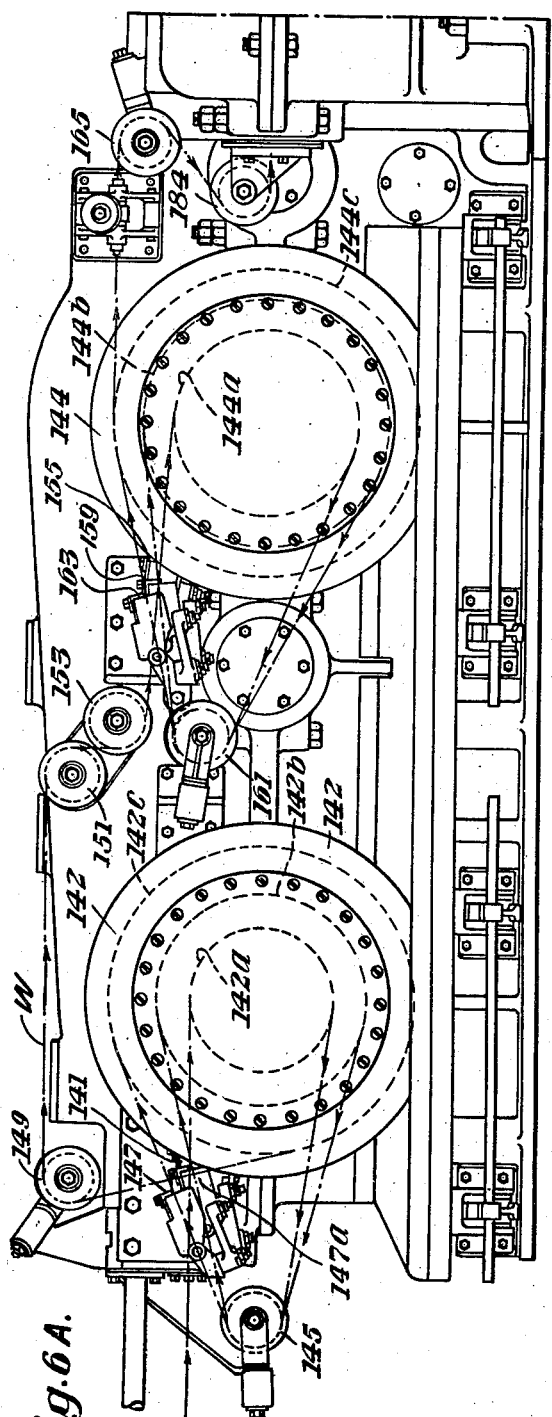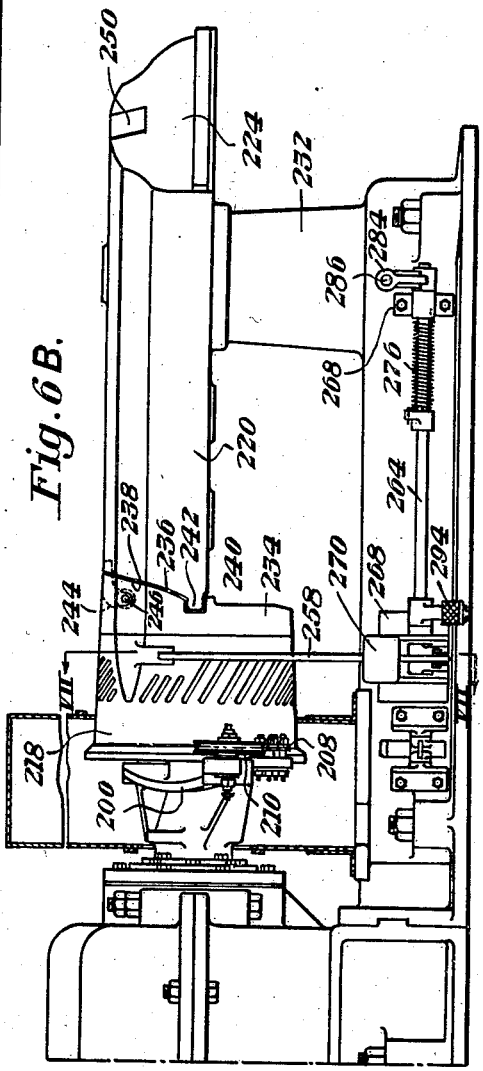

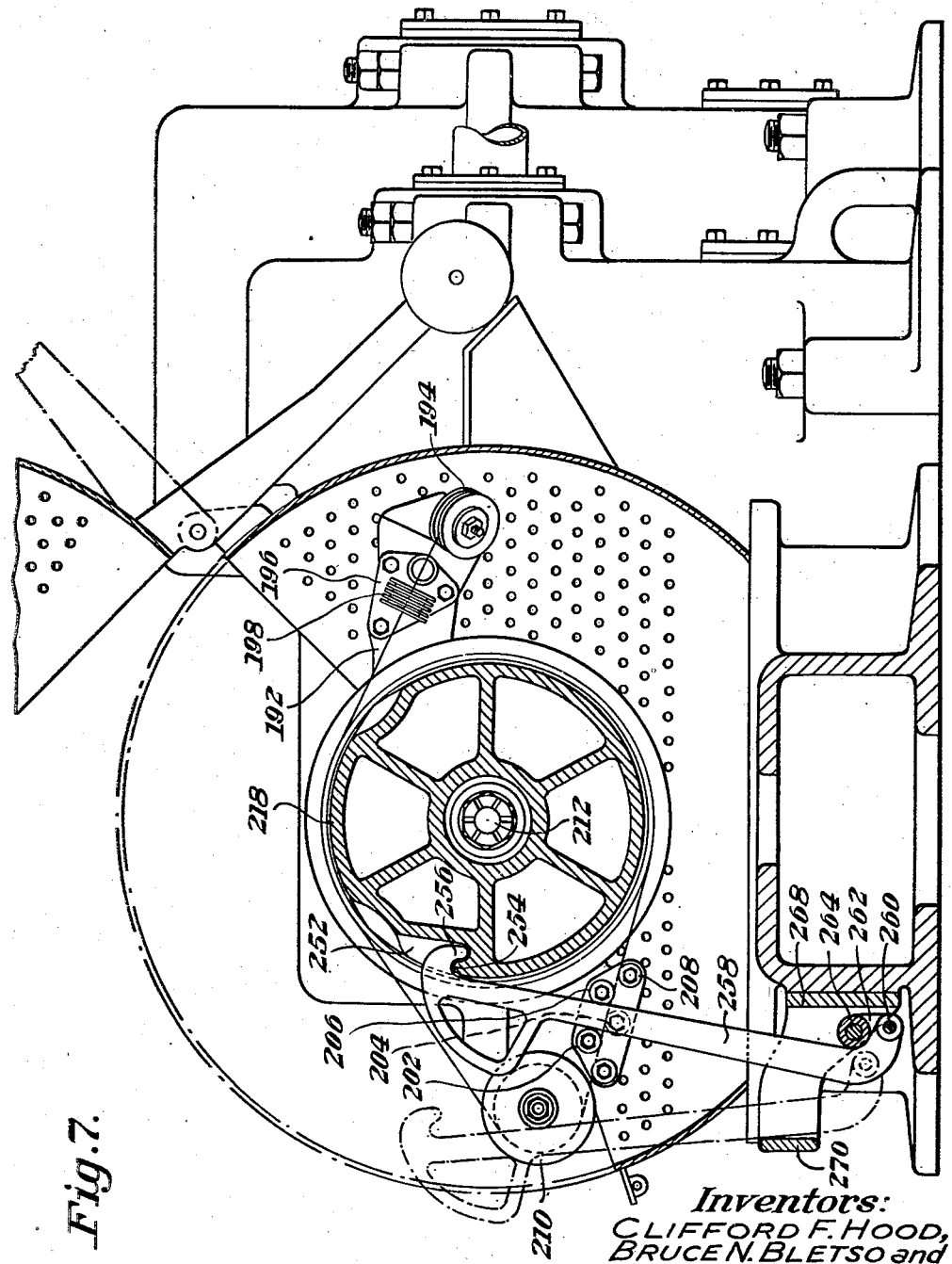

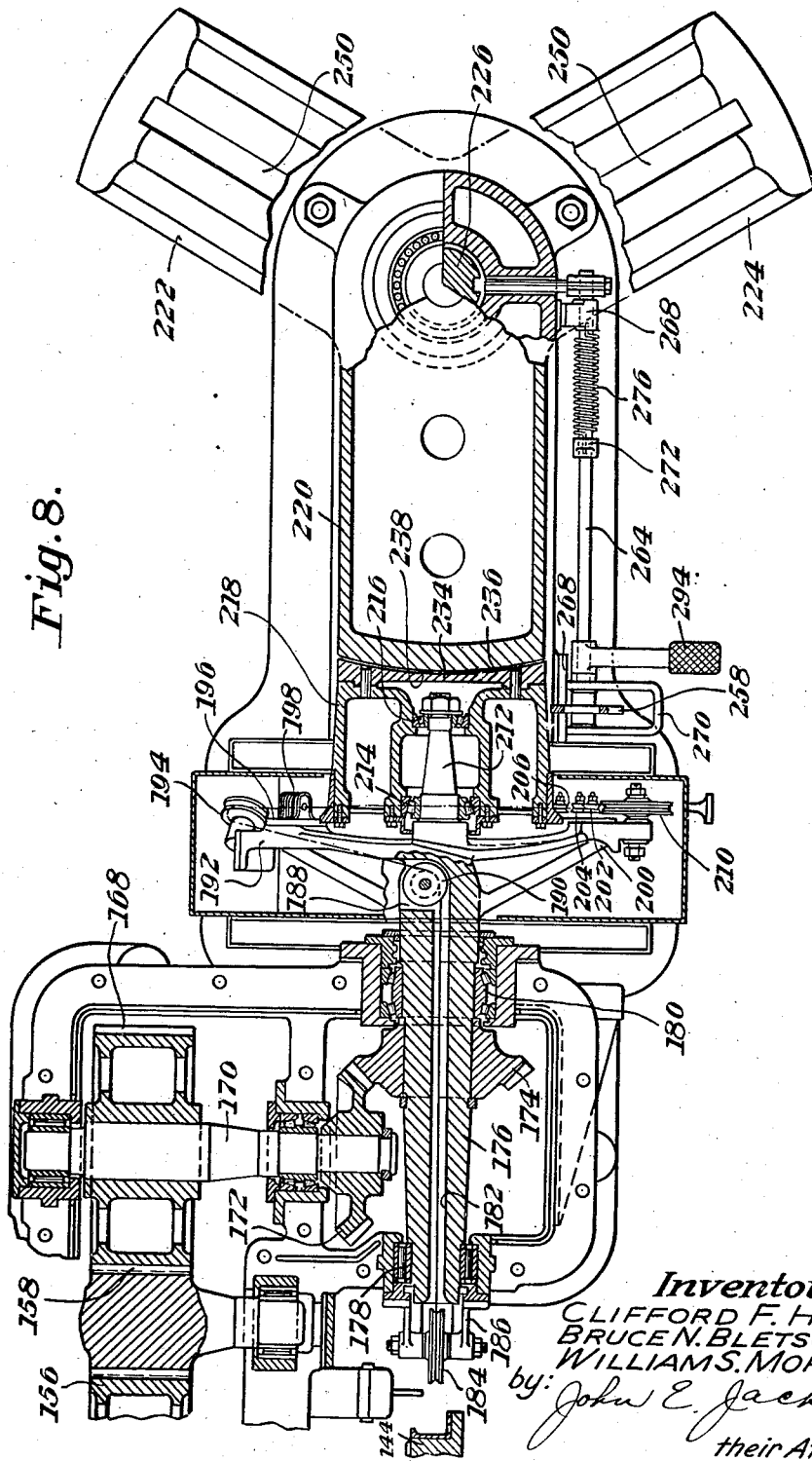

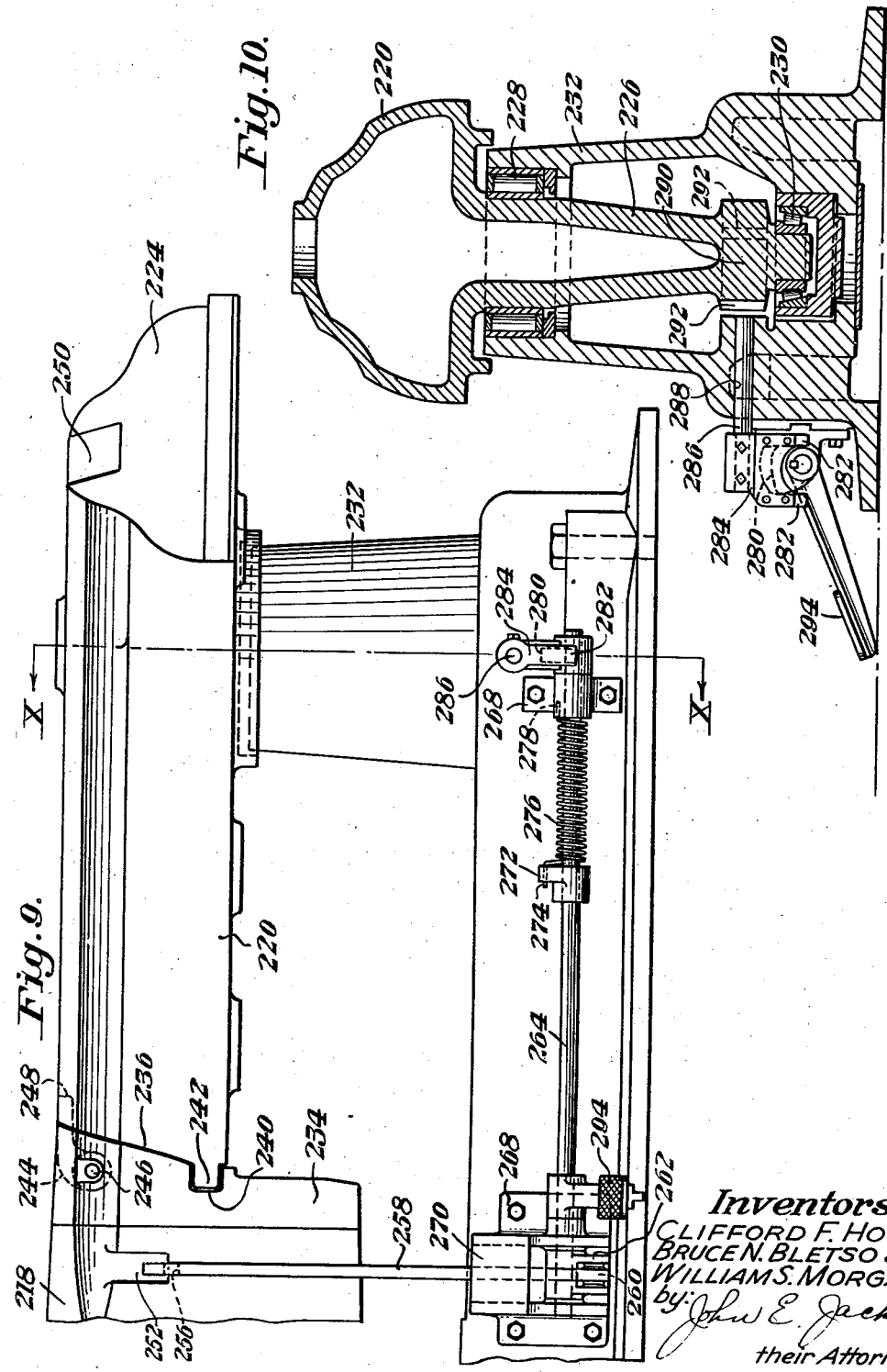

2,348,595

UNITED STATES PATENT OFFICE 2,348,595

WIRE WINDING MECHANISM

Bruce N. Bletso, East Cleveland, and Clifford F. Hood, Shaker Heights, Ohio, and William S. Morgan, Plainfield, Ill., assignors to The American Steel and Wire Company of New Jersey, a corporation of New Jersey Application January 4, 1943, Serial No. 471,306

13 Claims. (Cl. 205—16)

The present invention relates to improvements in winding mechanism peculiarly well suited for accumulating the wire drawn from a multiple draft wire-drawing machine.

It is broadly old, in the wire-drawing art, to provide a rotating member for successively wrapping convolutions or coils of wire about a stationary block. The present invention relates to specific features of construction and arrangement in such broadly old mechanism, which make it possible to operate at a much higher rate of speed than that attainable by prior art devices. Thus greatly increased production is obtained by use of the invention.

The features which characterize the invention will be fully apparent from the following detailed disclosure when read in connection with the accompanying drawings, and will be defined, in accordance with the requirements of the patent statutes, in the appended claims.

In the drawings:

Figure 1 is a plan view of one embodiment of the invention as applied to a multiple draft wire-drawing machine.

Figure 2 is a side elevation thereof.

Figure 3 is an end elevation from the right of Figure 2.

Figure 4 is an enlarged longitudinal section on line IV—IV of Figure 1.

Figure 5A:
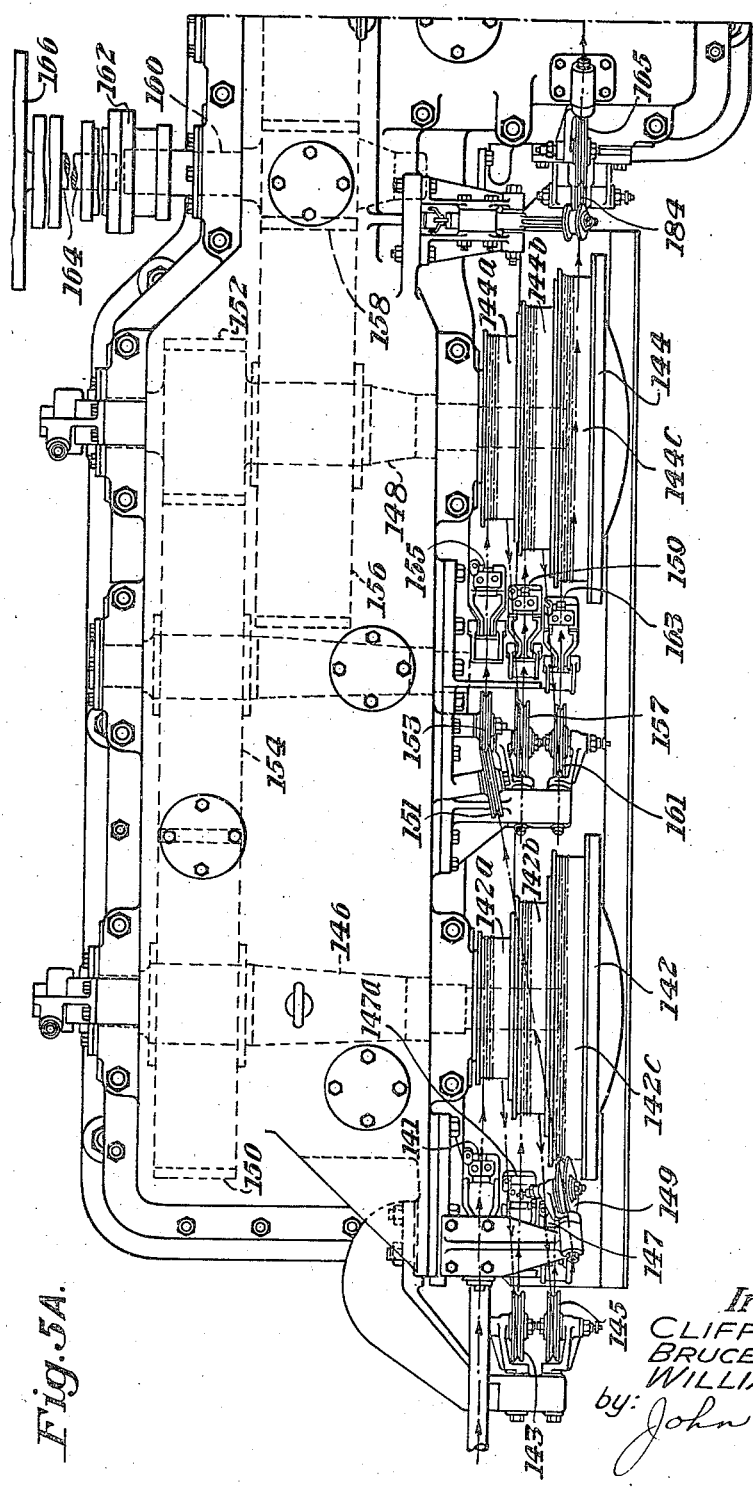

Figures 5A and 5B, when joined along the broken lines at the right and left ends thereof, show a plan view of an alternative embodiment of the invention.

Figure 6A is a side elevation of Figure 5A.

Figure 6B is a side elevation of Figure 5B.

Figure 7 is a transverse section on line VII—VII of Figure 6B.

Figure 8 is an enlarged fragmentary horizontal section taken axially of the rotating spindle and stationary block supported thereby, shown in Figures 6B and 7.

Figure 9 is an enlarged side elevation of a portion of Figure 8, illustrative of means for coordinating the locking mechanism of a wire-receiving turret with means for releasably holding stationary a block supported by the rotating spindle of the machine.

Figure 10 is a section on line X—X of Figure 9.

Before describing the improved mechanism in detail, it is to be noted that the accompanying drawings illustrate two alternative embodiments of the invention, both of which embody many of the same fundamental principles of operation and design. The chief difference is that in the embodiment illustrated in Figures 1 to 4 inclusive, the convolutions of wire accumulated on and discharged from the stationary block are ultimately received by an extension of the block rigidly secured thereto, while in the embodiment shown in Figures 5 to 10 inclusive, the coiled wire accumulated on the block is intermittently discharged to different arms of a turret mounted in juxtaposition to the block, the arms being successively brought to wire-receiving position.

Referring first to Figures 1 to 4 inclusive, reference numeral 10 represents the frame structure of a conventional form of multiple draft wire-drawing machine. Such a conventional machine includes a cone-like wire draw-off capstan indicated generally at 12. This capstan includes a multiplicity of stepped draw-off portions 14, each of which draws a separate stretch of wire through a respective die 16 carried in a conventional die holder 18. The different stretches of wire are looped around rotatably mounted idler sheaves 20 of conventional form, and separator pins 22 segregate the different stretches in the conventional manner.

A main drive motor 24 mounted on a suitable base secured to the frame 10 of the machine has an armature shaft to which is secured a pulley 26 which is connected by a belt 28 with a pulley 30 secured to a shaft 32 which carries one element of a clutch indicated generally at 34. A clutch-operating member 36 controls transmission of motion to a shaft section 38 aligned with the shaft 32. The shaft section 38 has keyed or otherwise secured thereto the stepped wire draw-off capstan above referred to. The shafts 38 and 32 are suitably mounted in bearings 40—42, as shown.

As the last stretch of wire, indicated at W in Figure 1, leaves the capstan 12, it passes through a finishing die 44 mounted on a die-holder secured to the frame 10, and thence around a fixed guide sheave 46 which directs it centrally to a passageway 48 extending axially of a rotating spindle 50 supported by ball or other suitable antifriction bearings 52—54 carried in housings 56 and 58. The spindle 50 has a pulley 60 secured thereto which is driven by a belt 62 trained around a pulley 64 secured to the above mentioned shaft 38. Thus the spindle is driven in synchronism with the draw-off capstan 14.

The spindle is formed with a radially-extending slot 66 communicating with the passageway 48, and rotatably mounted adjacent the said slot is a guide sheave 68 journaled on a pin 70 suitably supported in the hub portion 72 of a disc 74. This disc is recessed at 76, and is provided with a guide sheave 78 for guiding the wire to a stationary block indicated generally at 80, which is supported by ball or other antifriction bearings 82 and 84 mounted on a reduced shank 86 formed on the extremity of the rotating spindle. A circular plate 88 is secured by suitable bolts to the stationary block so as to retain the bearing 84 in proper position. A collar 92 is mounted on a reduced portion 94 at the extreme end of the shank portion 86, and is held against endwise movement by a nut 96. Thus the nut presses the collar against the shouldered end of the shank 86 in such a manner that there is no appreciable driving torque transmitted to the stationary block, even though the spindle is rotated at a high rate of speed.

The disc 74 has mounted thereon, at a point about diametrically opposite the guide sheave 78, a plurality of grooved rolls 98, 100 and 102. These three rolls, as shown in Figure 3, are so mounted in offset relationship to one another that the wire passing between them follows an undulating path. The wire is guided to the roller 98 by a guide sheave 104, and is guided from the roller 102 by a guide sheave 106. This arrangement provides a straightener mechanism which is effective to impart a predetermined "set" to the fibre or grain structure of the wire, so as to facilitate coiling and remove certain stresses set up during a normal wire-drawing operation.

Secured integrally to the outer extremity of the stationary drawing block 80 is a receiver, indicated generally at 108, of skeleton form comprised of a plurality of circularly spaced rods 110 whose inner extremities are welded or otherwise secured at 112 to the outer end of the block 80, the rods being secured at several spaced intervals to frame rings 114. As shown in Figures 1 and 4, the rods forming the wire receiver are bent at a right angle to elbow form. Since the receiver is integrated with the stationary block which in turn is rotatably supported on the hollow revolving spindle, positioning means are provided for maintaining the receiver in a substantially horizontal position. This positioning means, as illustrated in Figures 2 and 3, comprises a yoke 116 on which the extremity of the receiver rests, this yoke being secured to an upright rod 118 which is threaded at 120 for coaction with positioning nuts 122 and 124 mounted for engagement with opposite faces of a fixed arm or bracket 126 bolted or otherwise secured at 128 to the side frame 10 of the wire drawing machine.

The receiver 108, while being disposed in a substantially horizontal position, is preferably so constructed and arranged that it is slightly inclined downwardly from the horizontal. This facilitates the smooth feeding of the convolutions of coiled wire product from the tapered stationary block 80 along the entire length of the receiver as the product accumulates.

In the operation of the embodiment of the invention illustrated in Figures 1 to 4 inclusive, the wire W is subjected to a multiplicity of drafts by the several wire drawing dies 16 and to a light finishing draft by the die 44. From the finishing die the wire passes around the rotatable guide sheave 46 through the axial passageway 48 in the rotating spindle 50, thence around guide sheave 68 and radially outward and over the guide sheave 78 carried by the rotating disc 74. From the sheave 78 the wire passes to the sheave 104. Between these guiding sheaves it makes a slight arc of contact with the stationary block 80, as shown. From guide sheave 104 the wire passes between the straightening rollers 98, 100 and 102, thence partway around guide sheave 106 and thence to the block 80.

In initially threading the machine, the free end of the wire is given a few turns around the stationary block and is temporarily fastened by twisting the free end several times around one of the rods, as suggested at 130.

The block is formed with an annular flange 132 having a rather abruptly tapered face 134 merging into fillet portion 136. From the point of tangency of the fillet, the block is slightly tapered, as indicated at 138. As thus arranged, when the spindle and disc rotate so as to propel the guide 78 and straightener members above described in a planetary manner about the relatively fixed block supported by the rotating spindle, successive convolutions will be wound on the block and the newly formed convolutions will gradually push previously formed convolutions forward. There is sufficient frictional grip between the wire and the stationary block to cause the wire to be continually pulled through the finishing die 44. After the block becomes approximately filled with juxtaposed convolutions, the free end which was temporarily anchored at 130 will be disconnected and the operator will then uncoil a few convolutions, then fasten the free end to the outer extremity of the skeleton frame, for example, at the point indicated at 140 in Figure 1. This procedure relieves the operator of any further duty in connection with the wire drawing machine, and permits high speed operation and the accumulation of a great quantity of wire on the skeleton extension member, it being apparent that as the disc 74 continues to rotate, the wire will be continuously wrapped around the fixed block, and as newly formed convolutions are added, after the block becomes filled the accumulation will be gradually pushed lengthwise along the skeleton elbow-like framework which constitutes a receiver.

In the embodiment of the invention shown in Figure 1, the skeleton receiver frame has a right angle bend formed therein, so as to direct the output to a convenient point remote from the wire-drawing machine proper or to a location convenient for the unloading of the accumulated coiled batch. After a predetermined quantity of coiled wire constituting a bundle of a weight convenient for handling and further processing or for shipment, the end anchored at 140 can be grasped or tagged and the wire can be severed at a point spaced from the annular flange 132, whereupon the operator can insert his arm through the end rings 114 of the skeleton frame and then slightly lift the skeleton frame clear of the yoke 116 to permit removal of the bundle from the skeleton frame receiver, the frame at this time partaking of partial rotary motion about the axis of the rotating spindle, such motion being permitted by virtue of the antifriction support afforded by the ball bearings carried by the fixed block 80. Or, instead of the operator inserting his arm between the rings of the skeleton frame, he may insert the cylindrical core of a spool having one end flange removed, and thus transfer the bundle to such cylindrical core. If desired, after the bundle has been thus transferred to the core, a detachable flange can be secured to the core so as to constitute a reel for convenience in further handling. Regardless of whether the coiled batch of wire is discharged direct to the operator's arm or to the core of the spool, when it is stripped from the skeleton receiver, only that portion of the wire contained for a predetermined distance beyond the end of the annular flange 132 of the block is removed. Usually none of the wire wound on the block itself is disturbed, for the reason that it is desirable to leave a substantial number of convolutions wrapped around the block in order to create sufficient friction to enable the revolving disc and parts carried thereby to pull the wire through the finishing die 44 and wind the drawn wire onto the fixed block, permitting the previously wound convolutions to slip relatively to the block.

After the bundle has been removed, the skeleton frame receiver again comes to rest against the yoke 116, and in the rest position the receiver is inclined downwardly so as to facilitate a slipping of the many convolutions of the bundle therealong, under influence of the feeding impetus given thereto by the continuous planetary winding of the drawn wire about the block. The angle of inclination of the skeleton frame receiver to the horizontal can be adjusted with precision to suit different diameters of coils or gauges of wire, by manipulating the adjusting screws 122 and 124, as will be readily apparent from an examination of Figure 3.

In the alternative embodiment of the invention illustrated in Figures 5 to 10 inclusive, there is shown a multiple draft wire-drawing machine including respective stepped draw-off drums 142 and 144 carried on respective shafts 146 and 148. These carry gears 150 and 152 connected by an idler 154. The shaft 148 also carries a gear 156 which meshes with a pinion 158 mounted on a main drive shaft 160 connected by a suitable flexible coupling 162 with the armature shaft 164 of a heavy duty drive motor 166. The rod stock from which the wire is drawn first passes through a die 141, as shown in Figure 5. Thence it goes around the smallest diameter step 142ª of the drum 142 and over a guide sheave 143, and through die 147ª, thence around the intermediate step 142ᵇ of drum 142, then over sheave 145 and through die 147. From the die 147 the wire passes around the largest step 142ᶜ, over sheave 149 to guide sheave 151, thence to sheave 153 through die 155 around smallest step 144ª of the draw-off drum 144, then over sheave 157 through die 159 around the middle step 144ᵇ of drum 144 over sheave 161 through die 163 around the largest step 144ᶜ, thence around sheave 165. From the sheave 165 the wire is then led to a guide sheave 184, which directs it through a hollow rotating spindle 176 referred to more fully hereinafter.

The several shafts referred to are carried in conventional forms of roller or other antifriction bearings, and the parts may be water-cooled in a conventional manner and lubricated by a forcefeed lubricating system of known type. Since the water cooling and lubricating systems form no part of the claimed invention, they are not further illustrated or described.

The drive pinion 158 meshes with the gear 168 carried by shaft 170 mounted in suitable bearings as shown. A miter gear 172 secured to the shaft 170 meshes with a similar miter gear 174 secured to a spindle 176 rotatably supported by antifriction bearings 178 and 180 suitably mounted in housings to thus rotatably support the spindle and parts carried thereby.

The spindle has a passageway 182 extending axially thereof through which the wire is continuously fed. In juxtaposition to the entrance end of the spindle passageway there is a guide sheave 184 rotatable in fixed bearings 186 mounted on the frame structure of the machine. The spindle 176 has a radially-extending groove 188 formed therein, and there is a guide sheave 190 located in said groove. The spindle carries one substantially radial arm 192 on the outer portion of which is mounted a guide sheave 194. In some cases the arm 192 will be provided with a holder 196 for positioning a finish wire-drawing die 198. Located approximately diametrically opposite the arm 192 is another arm 200 carrying a plurality of wire straightener rollers 202, 204, 206 and 208. This arm also carries a guide sheave 210.

The outer extremity of the rotating spindle 176 is formed with a shank 212 on which antifriction bearings 214 and 216 are mounted, these bearings affording a support for the normally stationary block 218. In this embodiment of the invention, successive convolutions of wire are wrapped around the stationary block 218, and are periodically transferred to respective arms 220, 222 and 224 of a turret. The arms are substantially horizontally disposed, and the turret is formed with a central pedestal 226 rotatably journaled in upright bearings 228 and 230, carried by the upright hub-like housing 232 of the base of the machine. As thus arranged, it is manifest that after a given batch has been accumulated on any one arm of the turret, the wire may be severed and the turret turned to bring another arm into registry with the block 218.

Since the block 218 is intended to be normally stationary and yet be supported on the end shank of the rotating spindle, it is important to provide special means for preventing the rotation of the block during the time the turret is being moved to bring a new arm into registry with the block. With such a combination of apparatus, it is also important to provide special locking means for the turret and to coordinate the turret locking means with the device for preventing rotation of the block. Such coordinated instrumentalities incorporated in the machine shown are best illustrated in Figures 6, 9, and 10. It is also important, in transferring the coiled convolutions of wire from the block 218 to the respective arms of the turret, to provide a bridge member so as to prevent fouling of the coiled product by its entry into the clearance space between the normally stationary block and the turret arm. As best shown in Figures 6 and 9, the stationary block has an end piece 234 pinned or otherwise secured thereto. As shown in Figure 8, the upright end face of this end piece is of arcuate form, as indicated at 236, and is concentric with the peripheral end face 238 of the turret arms. This endpiece 234 is formed with a notch 240 for coaction with a respective lip 242 formed on the end of each of the turntable arms so that when any turret arm is in alignment with the fixed block, the interengagement of the lip on the arm with the notch of the end piece will prevent rotation of the block.

A bridge member 244 is mounted in a suitable recess formed in the outer portion of the end piece of the block, the same being pivotally mounted on a pin 246. This bridge member has a portion 248 which extends across the clearance space or gap between the end piece of the block and the ends of the turret arms. The turret arms are recessed as indicated at 250 to accommodate the extension 248 of the bridge member. Preferably the turret arms are so constructed and arranged that the top face thereof is a trifle lower than the uppermost portion of the periphery of the block end piece. Thus, as the convolutions are successively pushed off the block end piece, they will ride with a minimum of friction over the bridge member 244 and thus be gently transferred to the turret arm.

After a predetermined batch of wire has been accumulated on each arm of the turret, the wire will be severed, whereupon the bridge 248 will be swung upwardly on its pivot and turret turned a fraction of a revolution to bring a new and empty arm into wire-receiving position.

The block 218 is recessed at 252 so as to provide an abutment 254 for coaction with the hooked end 256 of a pawl 258 which is adapted, when in the full line position of Figure 7, to prevent the rotation of the block 218. Incidentally, it is noted that the provision of the recesses 252 also provides a convenient means for giving access to a convolution at a point where it may be severed after a given batch has accumulated on a given turret arm.

For coordinating the operation of the block-holding pawl 258 with that of the turret lock, the pawl is mounted on a pin 260 carried by a toggle-arm 262 secured to a rock shaft 264 (Figures 7, 9, and 10). This shaft 264 is rotatably mounted in bearing brackets, as shown. The left bracket 268, as shown in Figure 8, is formed with a bale-like portion including a fixed cross bar 270 which serves as a back-stop to limit the extent of pivotal movement of the pawl 258 when the latter is swung to the dotted line unlocked position of Figure 7. The rock shaft 264 has secured thereto an arm 272 to which is secured one end 274 of a torsion spring 276. The opposite end 278 of said spring is anchored in the bracket 268, and the spring is so wound and anchored to the parts described that it normally tends to turn the rock shaft 264 clockwise, as viewed in Figures 7 and 10.

Secured adjacent the right extremity of the shaft 264, as shown in Figure 9, is a cam 280 which coacts with depending jaws 282—282 of a member 284 secured to a locking pin 286 slidably mounted in a guide bore 288 formed in the main frame structure of the machine. The turret pedestal 226 is provided near its lower extremity with an annular locking portion 290 having three notches 292 formed therein, the number of notches corresponding to the number of turret arms. The coacting parts for the turret and stationary block, when arranged as above described, coordinate the mechanism in such a way that when the turret arms are aligned with the block 218, the latter is prevented from rotating because of the interengagement of the lip 242 with a notch 240 in the block end piece. In this normal wire-drawing position, the locking pin 286 will engage one of the notches 292 in the spindle and thus positively prevent the turning of the turret while wire is being drawn and continuously transferred from the stationary block to the receiving arm of the turret.

When a given batch has accumulated on one of the arms, the operator will depress a foot treadle 294 secured to the shaft 264, and thus turn the cam 280 counterclockwise as shown in Figure 10, so as to cause withdrawal of the bolt 288 from the notch 292. At this time the pawl 258 will be in the full-line position of Figure 7, to thus prevent torque exerted by the rotating spindle 176 from transmitting a turning movement to the block 218. After an empty turret arm has been swung into wire-receiving position, the operator will release the foot pressure from the treadle and the shaft 264 will be turned clockwise by the action of the torsion spring 276. This will swing the toggle arm 262 to the dotted-line position of Figure 7, to thus elevate the pawl to such position that when it is swung about its pivot pin 260, its hooked end 256 will pass freely over the abutment 254 so as to permit the pawl to lock the block against clockwise rotation, as viewed in Figure 7, at which time the parts will assume the full-line position of Figure 7. It is thus apparent that whenever the turret arms are in wire-receiving position, the block is locked against rotation by the interengagement with said arms, and during the time interval which elapses while transferring a turret arm from one position to the other, rotation of the block is prevented by the hooked end of the pawl. Thus the wire-drawing operation may proceed continuously in an uninterrupted manner without likelihood of fouling the machine due to the inadvertent or accidental turning of either the block or the turret.

In both embodiments of the invention illustrated, the wire-drawing machine operates continuously for long periods, and different batches of wire are accumulated and removed from time to time without interference with the continuity of the wire-drawing operation. The horizontal disposition of the receiver, whether it be in the elbow form constituting an integral extension of the fixed block as shown in Figures 1 to 5 inclusive, or in the form of separate turret arms, as shown in Figures 5 to 10 inclusive, is deemed to be of considerable importance because it provides for the accumulation of wire in greatly increased separate batches, and permits of the severing of any given batch without stopping the machine. The horizontal disposition of the receiver also permits an operator to readily have access to the desired point of severing, and since the convolutions are supported in a horizontal position, in handling the severed bundle the weight of convolutions will not tend to snarl the same as is the case when the stock is accumulated on a vertically disposed block or receiver.

While in the foregoing detailed disclosure we have set forth with great particularity the structural details of two embodiments of the invention which actual reduction to practice has shown to be highly desirable, it is not to be construed that we are limited precisely thereto, since modifications and substitutions of equivalents may be made by those skilled in the art without departure from the spirit and scope of the invention as defined in the appended claims.

We claim:

1. In a wire-drawing machine having a die through which wire stock is drawn, a substantially horizontal stationary block for receiving the drawn wire, a substantially horizontal revolving spindle having a passageway for wire coincident with the axis of rotation thereof, a fixedly mounted member for guiding the wire into said axial passageway, antifriction bearings supporting said block on the end of said spindle remote from said guide member, respective inner and outer wire guides rotating with said spindle effective to guide and coil the drawn wire around said stationary block, and a substantially horizontal wire receiver a portion of which is aligned endwise with said stationary block to accumulate the coiled supply of wire discharged therefrom as a result of the continuous coiling of the drawn wire about the block.

2. In a wire-drawing machine having a die through which wire stock is drawn, a substantially horizontal stationary block for receiving the drawn wire, a substantially horizontal revolving spindle having a passageway for wire coincident with the axis of rotation thereof, a fixedly mounted guide sheave whose periphery is substantially tangent to said axial passageway, antifriction bearings supporting said block on the end of said spindle remote from said guide member, respective inner and outer guide sheaves rotating with said spindle effective to guide and coil the drawn wire around said stationary block, wire straightening means revolving with said spindle interposed between said guide sheaves, and a substantially horizontal wire receiver a portion of which is aligned endwise with said stationary block to accumulate the coiled supply of wire discharged therefrom as a result of the continuous coiling of the drawn wire about the block.

3. In a wire-drawing machine having a die through which wire stock is drawn, a substantially horizontal stationary block for receiving the drawn wire, a substantially horizontal revolving spindle having a passageway for wire coincident with the axis of rotation thereof, a fixedly mounted member for guiding the wire into said axial passageway, antifriction bearings supporting said block on the end of said spindle remote from said guide member, respective inner and outer wire guides rotating with said spindle effective to guide and coil the drawn wire around said stationary block, and a horizontally disposed skeleton extension of elbow form secured to the end of said stationary block and adapted to accumulate the coiled supply of wire discharged therefrom as a result of the continuous coiling of the drawn wire about the block.

4. In a wire-drawing machine having a die through which wire stock is drawn, a substantially horizontal stationary block for receiving the drawn wire, a substantially horizontal revolving spindle having a passageway for wire coincident with the axis of rotation thereof, a fixedly mounted member for guiding the wire into said passageway, antifriction bearings supporting said block on the end of said spindle remote from said guide member, respective inner and outer wire guides rotating with said spindle effective to guide and coil the drawn wire around said stationary block, a substantially horizontally disposed wire receiver of elbow form having a portion aligned endwise with and pivotally supported by said stationary block to accumulate the coiled supply of wire discharged therefrom as a result of the continuous coiling of the drawn wire about the block, and a fixed support on which loosely rests the extremity of said receiver, said support normally holding said receiver against turning on its pivotal mounting yet adapted to permit such turning to facilitate stripping the accumulated batch of wire therefrom.

5. In a wire-drawing machine having a die through which wire stock is drawn, a substantially horizontal stationary block for receiving the drawn wire, a substantially horizontal revolving spindle having a passageway for wire extending axially thereof, a fixedly mounted member for guiding the wire into said passageway, antifriction bearings supporting said block on the end of said spindle remote from said guide member, respective inner and outer wire guides rotating with said spindle effective to guide and coil the drawn wire around said stationary block, and a turret rotatable about a substantially vertical axis having a plurality of substantially horizontal arms adapted to be successively aligned with said block so as to accumulate the coiled supply of wire discharged therefrom as a result of coiling the drawn wire about the block.

6. In a wire-drawing machine having a die through which wire stock is drawn, a substantially horizontal stationary block for receiving the drawn wire, a substantially horizontal revolving spindle having a passageway for wire extending axially thereof, a fixedly mounted member for guiding the wire into said passageway, antifriction bearings supporting said block on the end of said spindle remote from said guide member, respective inner and outer wire guides rotating with said spindle effective to guide and coil the drawn wire around said stationary block, a turret rotatable about a substantially vertical axis having a plurality of substantially horizontal arms adapted to be successively aligned with said block so as to accumulate the coiled supply of wire discharged therefrom as a result of coiling the drawn wire about the block, restraining means for preventing the rotation of said block, a latch for locking said turret in positions to successively align said arms with said block, and means for releasing said latch.

7. In a wire-drawing machine having a die through which wire stock is drawn, a substantially horizontal stationary block for receiving the drawn wire, a substantially horizontal revolving spindle having a passageway for wire extending axially thereof, a fixedly mounted member for guiding the wire into said passageway, antifriction bearings supporting said block on the end of said spindle remote from said guide member, respective inner and outer wire guides rotating with said spindle effective to guide and coil the drawn wire around said stationary block, a turret rotatable about a substantially vertical axis having a plurality of substantially horizontal arms adapted to be successively aligned with said block so as to accumulate the coiled supply of wire discharged therefrom as a result of coiling the drawn wire about the block, restraining means for preventing the rotation of said block, other means operable to prevent the rotation of the block when the said restraining means are disengaged, a latch for locking said turret in positions to successively align said arms with said block, and means for releasing said latch.

8. In a wire-drawing machine having a die through which wire stock is drawn, a substantially horizontal stationary block for receiving the drawn wire, a substantially horizontal revolving spindle having a passageway for wire extending axially thereof, a fixedly mounted member for guiding the wire into said passageway, antifriction bearings supporting said block on the end of said spindle remote from said guide member, respective inner and outer wire guides rotating with said spindle effective to guide and coil the drawn wire around said stationary block, a turret rotatable about a substantially vertical axis having a plurality of substantially horizontal arms adapted to be successively aligned with said block so as to accumulate the coiled supply of wire discharged therefrom as a result of coiling the drawn wire about the block, and a member adapted to bridge the slight space between said block and each of said arms when the latter are aligned therewith.

9. In a wire-drawing machine having a die through which wire stock is drawn, a substantially horizontal stationary block for receiving the drawn wire, a substantially horizontal revolving spindle having a passageway for wire extending axially thereof, a fixedly mounted member for guiding the wire into said passageway, antifriction bearings supporting said block on the end of said spindle remote from said guide member, respective inner and outer wire guides rotating with said spindle effective to guide and coil the drawn wire around said stationary block, a turret rotatable about a substantially vertical axis having a plurality of substantially horizontal arms adapted to be successively aligned with said block so as to accumulate a batch of wire discharged therefrom as a result of coiling the drawn wire about the block, each of said arms having a recess in its upper face, and a bridge member pivotally mounted on said block and having a portion extending beyond the outer end thereof and adapted to enter the respective recesses in the arms as the latter are successively aligned with said block.

10. In a wire-drawing machine having a die through which wire stock is drawn, a substantially horizontal stationary block for receiving the drawn wire, a substantially horizontal revolving spindle having a passageway for wire extending axially thereof, a fixedly mounted member for guiding the wire into said passageway, antifriction bearings supporting said block on the end of said spindle remote from said guide member, respective inner and outer wire guides rotating with said spindle effective to guide and coil the drawn wire around said stationary block, a turret rotatable about a substantially vertical axis having a plurality of substantially horizontal arms adapted to be successively aligned with said block so as to accumulate the coiled supply of wire discharged therefrom as a result of coiling the drawn wire about the block, a rock shaft carrying a cam, a locking pin actuated by said cam and coacting with locking notches formed in a portion of said turret, means tending to turn said rock shaft in a direction to cause said cam to move the pin into engagement with said notches, a pedal for turning said rock shaft in the opposite direction to retract said locking pin, an arm on said rock shaft having a locking pawl pivotally secured thereto, and an abutment on said block for coaction with said pawl and to prevent rotation of the block when the locking pin is retracted from said notches and the arms of the turret are disconnected from said block, said pawl being automatically shifted to position to release it from said abutment upon the rocking of said shaft to position to engage the locking pin with said turret notches.

11. In a wire-drawing machine having a die through which wire stock is drawn, a substantially horizontal stationary block for receiving the drawn wire, a substantially horizontal revolving spindle having a passageway for wire coincident with the axis of rotation thereof, antifriction bearings supporting said block on the end of said spindle, respective inner and outer wire guides rotating with said spindle effective to guide and coil the drawn wire around said stationary block, and a substantially horizontal wire receiver a portion of which is aligned endwise with said stationary block to accumulate the coiled supply of wire discharged therefrom as a result of the continuous coiling of the drawn wire about the block.

12. In a wire-drawing machine having a die through which wire stock is drawn, a substantially horizontal stationary block for receiving the drawn wire, a substantially horizontal revolving spindle having a passageway for wire coincident with the axis of rotation thereof, antifriction bearings supporting said block on the end of said spindle, respective inner and outer wire guides rotating with said spindle effective to guide and coil the drawn wire around said stationary block, and a horizontally disposed skeleton extension of elbow form secured to the end of said stationary block and adapted to accumulate the coiled supply of wire discharged therefrom as a result of the continuous coiling of the drawn wire about the block.

13. In a wire-drawing machine having a die through which wire stock is drawn, a substantially horizontal stationary block for receiving the drawn wire, a substantially horizontal revolving spindle having a passageway for wire extending axially thereof, antifriction bearings supporting said block on the end of said spindle, respective inner and outer wire guides rotating with said spindle effective to guide and coil the drawn wire around said stationary block, and a turret rotatable about a substantially vertical axis having a plurality of substantially horizontal arms adapted to be successively aligned with said block so as to accumulate the coiled supply of wire discharged therefrom as a result of coiling the drawn wire about the block.

BRUCE N. BLETSO.
CLIFFORD F. HOOD.
WILLIAM S. MORGAN.